(12) United States Patent
Dangler et al.

(10) Patent No.: US 9,728,990 B2
(45) Date of Patent: Aug. 8, 2017

(54) FAST CHARGE MODE FOR EXTENDED TRIP

(71) Applicant: Tesla Motors, Inc., Palo Alto, CA (US)

(72) Inventors: Christopher Dangler, San Francisco, CA (US); Sarah G. Stewart, San Francisco, CA (US); Clay Hajime Kishiyama, San Mateo, CA (US)

(73) Assignee: TESLA, INC., Palo Alto, CA (US)

( * ) Notice: Subject to any disclaimer, the term of this patent is extended or adjusted under 35 U.S.C. 154(b) by 830 days.

(21) Appl. No.: 13/665,116

(22) Filed: Oct. 31, 2012

(65) Prior Publication Data

US 2014/0121866 A1     May 1, 2014

(51) Int. Cl.
| | | |
|---|---|---|
| *H02J 7/00* | (2006.01) | |
| *G01C 21/00* | (2006.01) | |
| *G06F 17/00* | (2006.01) | |
| *B60L 11/18* | (2006.01) | |

(52) U.S. Cl.
CPC ............ *H02J 7/007* (2013.01); *B60L 11/185* (2013.01); *B60L 11/187* (2013.01); *B60L 11/1816* (2013.01); *H02J 7/0029* (2013.01); *B60L 2240/36* (2013.01); *B60L 2240/545* (2013.01); *B60L 2240/80* (2013.01); *B60L 2250/14* (2013.01); *B60L 2250/20* (2013.01); *B60L 2260/50* (2013.01); *Y02T 10/7005* (2013.01); *Y02T 10/705* (2013.01); *Y02T 10/7072* (2013.01); *Y02T 90/121* (2013.01); *Y02T 90/128* (2013.01); *Y02T 90/14* (2013.01)

(58) Field of Classification Search
CPC ........... B60K 6/00; B60K 6/28; B60W 10/06; B60W 10/08; B60W 10/26; B60W 20/00; Y02T 10/6213; Y02T 10/6286; Y02T 10/7005; Y02T 10/7077
USPC ..... 701/22, 81; 320/104, 109; 903/902, 903, 903/907
See application file for complete search history.

(56) References Cited

U.S. PATENT DOCUMENTS

| | | | | |
|---|---|---|---|---|
| 5,623,195 | A * | 4/1997 | Bullock | H01M 10/443 320/153 |
| 6,624,615 | B1 | 9/2003 | Park | |
| 7,755,329 | B2 * | 7/2010 | Kohn | H02J 7/0091 320/150 |
| 8,174,235 | B2 * | 5/2012 | Dyer | B60L 11/1809 180/65.21 |
| 8,350,526 | B2 * | 1/2013 | Dyer | B60L 1/003 320/104 |

(Continued)

FOREIGN PATENT DOCUMENTS

| | | |
|---|---|---|
| CN | 2872708 Y | 2/2007 |
| CN | 101207293 A | 6/2008 |
| WO | WO 99/09420 A1 | 2/1999 |

OTHER PUBLICATIONS

International Application No. PCT/US2013/067064, International Search Report dated Jan. 29, 2014, 5 pages.

(Continued)

*Primary Examiner* — Atul Trivedi
(74) *Attorney, Agent, or Firm* — Garlick & Markison; Bruce E. Garlick

(57) ABSTRACT

A system and method for early identification of an impending fast-charge or fast-charge opportunity and use of that information to prepare the battery cells for the fast-charge.

19 Claims, 2 Drawing Sheets

(56) References Cited

U.S. PATENT DOCUMENTS

| | | | | |
|---|---|---|---|---|
| 8,587,253 B2* | 11/2013 | Dyer | ................... | B60L 11/1809 |
| | | | | 180/65.21 |
| 2003/0090238 A1* | 5/2003 | Wolin | ................... | H02J 7/0091 |
| | | | | 320/150 |
| 2004/0135552 A1* | 7/2004 | Wolin | ................... | H02J 7/0091 |
| | | | | 320/150 |
| 2004/0169489 A1* | 9/2004 | Hobbs | ................... | B60L 3/0046 |
| | | | | 320/104 |
| 2009/0143929 A1 | 6/2009 | Eberhard et al. | | |
| 2011/0156652 A1 | 6/2011 | Kishiyama et al. | | |
| 2011/0214930 A1* | 9/2011 | Betts | ....................... | B60L 11/18 |
| | | | | 180/65.1 |
| 2011/0298624 A1 | 12/2011 | Bauman et al. | | |
| 2012/0041628 A1* | 2/2012 | Hermann | .......... | H01M 8/04089 |
| | | | | 701/22 |
| 2012/0043935 A1* | 2/2012 | Dyer | ....................... | B60L 1/003 |
| | | | | 320/109 |
| 2012/0043943 A1* | 2/2012 | Dyer | ................... | B60L 11/1809 |
| | | | | 320/137 |
| 2012/0046815 A1* | 2/2012 | Hermann | ........... | B60H 1/00278 |
| | | | | 701/22 |
| 2013/0026998 A1* | 1/2013 | Dyer | ................... | B60L 11/1809 |
| | | | | 320/150 |

OTHER PUBLICATIONS

International preliminary report on patentability in application PCT/US2013/067064, May 5, 2015, 6 pages.
State Intellectual Property Office; Search Report; Aug. 30, 2016; 2 pgs.

* cited by examiner

FAST CHARGE MODE FOR EXTENDED TRIP

FIELD OF THE INVENTION

The present invention relates generally to charging battery cells of a rechargeable battery module, and more specifically, but not exclusively, to efficient fast charging of battery cells of a rechargeable battery module.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Fast charging of battery cells is improved when the battery cells are warmer than the typical ambient and/or standard operating temperature. Battery cells are often cooled and maintained at a decreased temperature during operation. This is counter-productive to the fast-charging conditions, and may unnecessarily consume resources in counter-productively cooling the battery cells.

What is needed is a system and method for early identification of an impending fast-charge or fast-charge opportunity and use of that information to prepare the battery cells for the fast-charge.

BRIEF SUMMARY OF THE INVENTION

Disclosed is a system and method for early identification of an impending fast-charge or fast-charge opportunity and use of that information to prepare the battery cells for the fast-charge.

The following summary of the invention is provided to facilitate an understanding of some of technical features related to fast-charging battery cells, and is not intended to be a full description of the present invention. A full appreciation of the various aspects of the invention can be gained by taking the entire specification, claims, drawings, and abstract as a whole. The present invention is applicable to other collections and uses of battery cells besides battery cell modules used in electric vehicles.

A fast-charging system for a rechargeable energy storage system, including a fast-charge prediction system identifying an upcoming fast-charge event for the rechargeable energy storage system; an environment control system coupled to the energy storage system controlling a temperature environment of the energy storage system responsive to a first operational profile using the temperature environment to adjust a temperature of the energy storage system to a first temperature target of a standard operating temperature; and a manager setting a second operational profile for the environment control system responsive to the upcoming fast-charge event, the second operation profile using the temperature environment to adjust the temperature of the energy storage system to a second temperature above the standard operating temperature.

A fast-charging method for an energy storage system, including a) identifying an upcoming fast-charge event for the rechargeable energy storage system; b) controlling a temperature environment for the energy storage system responsive to a first operational profile using the temperature environment to adjust a temperature of the energy storage system to a first temperature target for a standard operating temperature; and c) setting a second operational profile for the environment control system responsive to the upcoming fast-charge event, the second operation profile using the temperature environment to adjust the temperature to a second temperature above the standard operating temperature.

A charging system for a rechargeable energy storage system of an electric vehicle having an electric propulsion motor, including a charge prediction system identifying an upcoming charge event for the rechargeable energy storage system, the charge prediction system predicting one of a fast-charge event and a non-fast-charge event for the upcoming charge event; an environment control system coupled to the energy storage system controlling a temperature environment of the energy storage system responsive to a first operational profile using the temperature environment to adjust a temperature of the energy storage system to a first temperature target of a standard operating temperature; and a manager setting a second operational profile for the environment control system responsive to the upcoming fast-charge event, the second operation profile using the temperature environment to adjust the temperature of the energy storage system to a second temperature above the standard operating temperature when the upcoming charge event includes the fast charge event, otherwise the manager maintaining the first operational profile for the environment control system when the upcoming charge event includes the non-fast-charge event.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
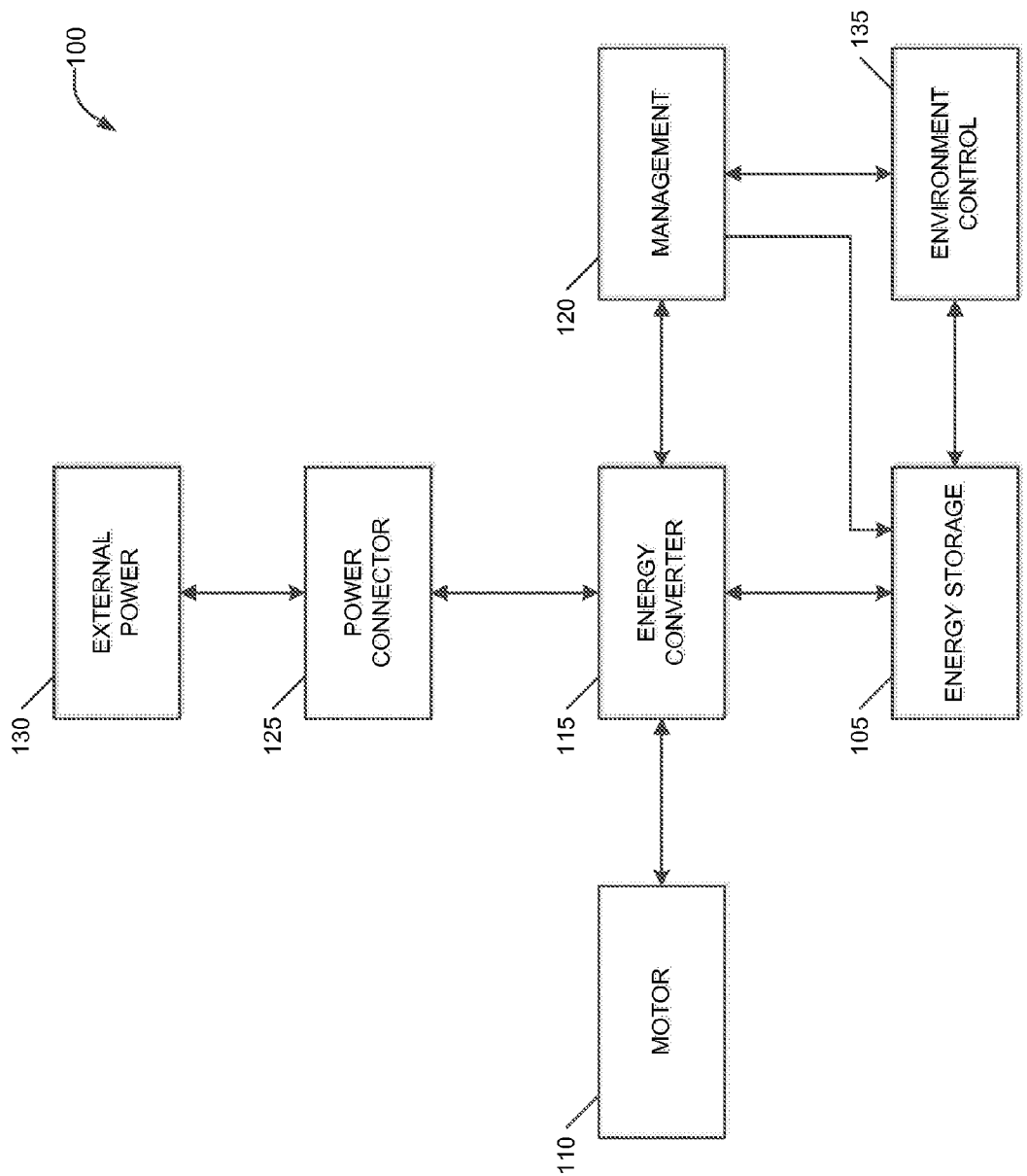
FIG. 1 is a schematic block diagram for a representative electric motor system incorporating a preferred embodiment of the present invention.

Embodiments of the present invention provide a system and method for early identification of an impending fast-charge or fast-charge opportunity and use of that information to prepare the battery cells for the fast-charge. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the following text, the terms "energy storage assembly," "battery," "cell," "battery cell," "battery cell module," and "battery cell pack," "electric double-layer capacitor," and "ultracapacitor," may be used interchangeably (unless the context indicates otherwise" and may refer to any of a variety of different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration.

Embodiments of the present invention are applicable to systems that employ electric motors in general, and more specifically to vehicles using multiphase electric induction motors powered by energy stored in an energy storage system that includes one or more battery cell modules arranged into a battery pack. Electric vehicles (EVs) include vehicles that have one or more sources of stored energy designed to provide electrical energy to the vehicle, wherein the electrical energy is used to at least in part to provide some energy used to propel the vehicle. Electric vehicles may include vehicles designed to carry passengers, to transport goods, or to provide specialty work capabilities. For example, electric vehicles include passenger automobiles, trucks, and recreational watercrafts such as boats. In addition, electric vehicles include specialty vehicles, such as fork trucks used to lift and move cargo, vehicles that incorporate conveyor belts to move objects, such as mobile conveyor belt vehicles used to load and unload cargo such as luggage from airplanes, and specialty equipment used in areas where exhaust fumes from typical gasoline, diesel, or propane powered equipment may present hazards to personnel, such as in underground mining operations. In various instances, electric vehicles are designed and intended to be operated on public highways as licensed automobiles, including both cars and trucks.

Generally, an electric vehicle includes some form of a device or devices capable of storing energy and that is operable to provide electrical power to the vehicle. The electrical power may be used to at least in part provide energy for propelling the vehicle. In some instances, the electrical power is used to provide the energy required for all of the vehicle's functions, including propelling the vehicle. In many instances, the source of the stored energy is a rechargeable battery pack. In various embodiments, a rechargeable battery pack includes a plurality of individual rechargeable battery cells that are electrically coupled to provide a rechargeable battery pack.

In the discussion herein, various rates of charging are described. For rechargeable energy storage systems, there are charging stations (sometimes EV charging station, electric recharging point, and the like) that supplies electric energy for EV recharging. The rate the energy storage system receives the electric energy is often specified according to a standard, such as a mode defined by the International Electrotechnical Commission (IEC). For example they define the terms slow charging and fast charging which are relevant to some of the embodiments of the present invention when detailing standard charging (non-fast charging—e.g., mode 1 or mode 2) and fast-charging (e.g., mode 3 or higher). Charging stations are typically viewed as providing predetermined quantized charging rates, sometimes a charging station may be able to supply either (or both) a fast charge and a slow charge. A prediction of a fast-charge event identifies the availability of fast charging rates from a fast-charging station.

In other contexts, fast charging and non-fast charging are related to lifetime performance effects of recharging on the energy storage system. The rate at which electric energy charges the energy storage system can impact the lifetime performance. In the present context, a non-fast charging rate is a rate where battery life is benefited by adjusting the cell temperature under a standard operating temperature and fast-charging is a charge rate where battery life is benefited by adjusting the temperature above the standard operating temperature. In a charge rate zone where the lifetime performance is not strongly dependent on the charge temperature a management system can maintain the standard operating temperature target when this target uses the least amount of energy.

Specifically, while charging at higher temperature lowers impedance there are other effects at play as well. When charging at typical rates (non-fast-charge rate) the best lifetime performance is below the drive standard operating temperature. Thus for these charges, the management system would want to lower the temperature of the battery pack before charge. However, as the charge rate increases, the benefits from going to higher temperature increase and there is a cross over point where the management system preferably heats the energy storage system to preserve lifetime performance.

Thus in the present content, the 'class' of charging that is trying to be predicted as a fast charge rate is a rate where it is necessary to increase the temperature of the cell in order to protect the cycle life of the cell. The temperature of the energy storage system is adjusted based upon the predicted charge rate of an upcoming charging event. Typically this means that when a fast charge rate is upcoming, the temperature of the energy storage system will need to be increased above the standard operating temperature. Based upon type of charging stations and charging rates available, the quantization of the charging rates means that, for most cases, the management system will either be in a heating mode for an upcoming fast charge mode or a cooling mode for an upcoming standard charge mode. The embodiments described herein do not include a dynamically changing response to the charge rate (some embodiments could do so), rather the mode would be selected by the management system based on the value or expected value of the charge rate. This process could, for example, use a lookup table, charge rate vs. temperature, so there may be different temperature targets for different charge rates.

Standard operating temperature varies based upon many factors, but for a particular implementation based upon a set of assumptions, it is a predetermined value. This standard operating temperature is a reference point used in by the embodiments of the present invention.

FIG. 1 is a schematic block diagram for a representative electric motor system 100 incorporating a preferred embodiment of the present invention. To simplify further discussion, system 100 will be described below in the context of an electric vehicle. However it is understood that system 100 may be part of another device or system other than an electric vehicle. System 100 includes an energy storage system (ESS) 105 that includes a vehicle propulsion battery or the like and at least one propulsion motor 110 for converting energy into mechanical motion, such as rotary motion. ESS 105 includes various components associated with transmitting energy to and from the vehicle propulsion battery in various examples, including safety components, cooling components, heating components, rectifiers, and the like. ESS 105 may be implemented in many different ways and include many different components, but for purposes of this example, ESS includes a propulsion battery, ultracapacitor, or the like. Thus, the present subject matter should not be construed to be limited to the configurations disclosed herein, as other configurations are possible and within the scope of the present invention.

The propulsion battery of ESS 105 of this example includes one or more lithium ion batteries. In some examples, the battery includes a plurality of lithium ion batteries coupled in parallel and/or series. Some examples include cylindrical lithium ion batteries. In some cases, ESS 105 includes one or more batteries compatible with the 18650 battery standard, but the present subject matter is not so limited. Some examples include hundreds to thousands of batteries which are interconnected. The vehicle propulsion battery used in ESS 105, in some examples, provides approximately 390 volts.

Additionally system 100 includes an energy converter 115. Energy converter 115 converts energy from ESS 105 into energy useable by motor 110. In some instances, there is energy flow from motor 110 into ESS 105 through energy converter 115. ESS 105 transmits energy to energy converter 115, which converts the transmitted energy into energy usable by motor 110 to propel the electric vehicle. Motor 110 may also generate energy that is transmitted to energy converter 115. In these instances, energy converter 115 converts the transmitted energy from motor 110 into energy which may be stored in ESS 105. Energy converter 115 includes semiconductor power devices such as transistors. These transistors may include one or more field effect transistors. Some examples include metal oxide semiconductor field effect transistors. Some examples include one or more insulated gate bipolar transistors. As such, in various examples, the energy converter 115 includes switching elements which are configured to receive direct current (DC) power from ESS 105 and to output multiphase (e.g., three-phase) alternating current (AC) to power motor 110. A rotary motion of motor 110 is transmitted from a transmission to one or more wheels of the EV via one or more axles.

A management system 120 provides control for one or more of ESS 105 and energy converter 115. In some cases, management system 120 is coupled to a vehicle system which monitors safety (such as a crash sensor). In some examples management system 120 is coupled to one or more driver inputs (such as a speed adjuster, colloquially termed a throttle, although the present subject matter is not limited to examples having an actual throttle). Management system 120 is configured to control power to one or more of ESS 105 and energy converter 115.

Some embodiments of management system 120 include a navigation system that may further include trip-planning features and a mapping system for identifying various destinations and points-of-interest and associated information including directions, range, drive time, and the like from a present location to the various destinations and points of interest. For purposes of the present invention, these points-of-interest include a home location, one or more destinations, way-points, and fast-charging stations. Management system 120 may collect all or a portion of this information automatically/autonomously, semi-automatically, or manually.

A power connector 125 accesses an external power source 130, e.g., a charging station, to receive energy and communicate it with ESS 105 through energy converter 115. In some examples, the charging station converts power from a single phase 110V AC power source into power storable by ESS 105. In additional examples, the charging station converts power from a 220V AC power source into power storable by ESS 105. Some implementations include single-phase line voltages while others employ polyphase line voltages. FIG. 1 illustrates an implementation in which energy converter 115 converts power from external power source 130 to energy storable by ESS 105.

ESS 105 is described herein as including cooling systems and temperature control equipment for maintaining ESS 105 at the desired operating temperature. System 100 includes an environmental control 135 that controls the cooling systems and temperature control equipment. Environmental control 135 may be incorporated into management system 120.

External power source 130 may be incorporated into recharging equipment that is sometimes referred to as an EV charging station or electric recharging point, charging point, electric vehicle supply equipment (EVSE). There are different performance levels (sometimes called charging modes) for this recharging equipment. These performance levels are sometimes referred to by different charging levels: level 1 is a relatively slow charging level available from 110 V AC, such as a type of charger available in many owner homes. A level 2 charging is 240 volt AC charging, and level 3 charging provides 500 volt DC high-current charging (also sometimes referred to as DC Fast Charge).

In typical operation, a user connects external power source 130 to power connector 125 to initiate charging of ESS 105. How long it takes to charge ESS 105 to the desired level depends upon several factors including a status of ESS 105 (e.g., a state of charge (SOC), cell temperature(s), cell chemistry, and the like) and charging level of external power source 130. Depending upon other factors, sometimes there is a conditioning period for ESS 105 prior to initiating charging. What happens to system 100 during this conditioning period can be dependent upon some of the real-time factors described herein. One of the big influences of what systems must be adjusted is what level of charging station will be used for recharging.

For example, fast charging of ESS 105 is improved when the cells in ESS 105 are warmer than the standard operating temperature. During operation, cells of ESS 105 are cooled and maintained within an operational temperature range that is no greater than a target temperature (e.g., 40° C.). Preferably during fast charging, the cells are maintained a minimum of 10 degrees Celsius above the standard operating temperature with a preferred temperature target about 40° C. This temperature is generally above the operating temperature range. Therefore ESS 105 must be adjusted (actively warming ESS 105 or passively allowing ESS 105 to rise) from the operational temperature to reach this fast-charging temperature. However in some cases cooling is necessary or desirable to reach the appropriate temperature for fast-charging (and/or standard non-fast-charging).

Management system 120 preferably anticipates when fast-charging is going to be used and prepares ESS 105 in advance so it is closer to the desired fast-charging temperature when the user desires to initiate fast-charging. There are various mechanisms by which management system 120 is able to anticipate this situation and/or prepare ESS for fast-charging.

Anticipation of an upcoming fast-charging event may be determined in many different ways. For purposes of this discussion, management system 120 operates the EV using an operational profile for cooling, warming, charging, discharging, and the like prior to this determination. Once management system 120 determines that a fast-charging event is upcoming, depending upon operating conditions of the EV, management system 120 switches to a pre-fast-charging profile for cooling, warming, charging, discharging, and the like. The current operating conditions and the immediacy of the upcoming fast-charging event determine an aggressiveness level of the pre-fast-charging profile. The following examples describe various determination modalities for establishing that a fast-charging event is upcoming as well as various pre-fast-charging profiles. Unless indicated to the contrary, the various manners of determination may be matched to the various pre-fast-charging profiles.

Figure 2:
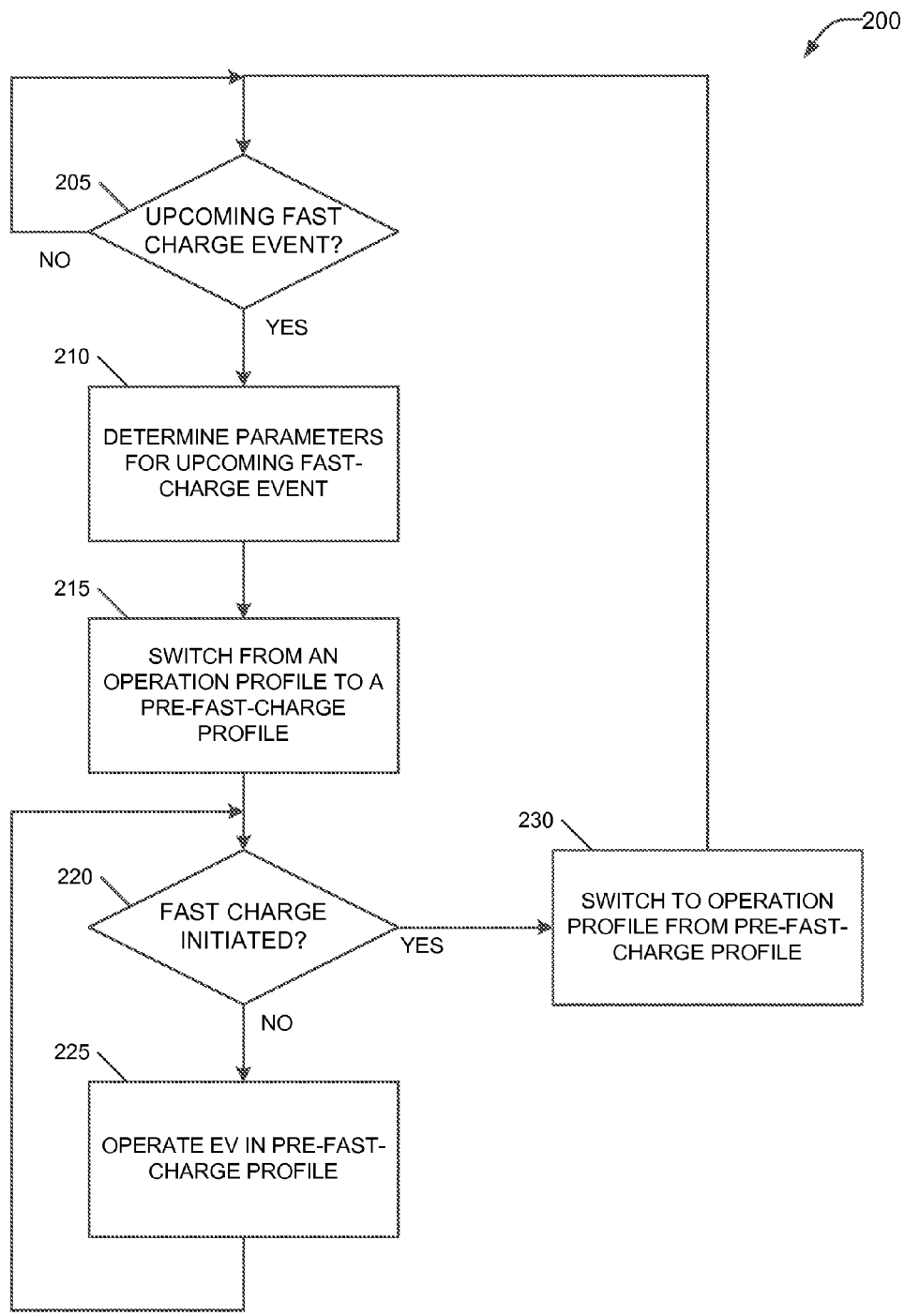
FIG. 2 illustrates a flowchart for a process that may be implemented by the management system of FIG. 1.

FIG. 2 illustrates a flowchart for a process 200 that may be implemented by management system 120 of FIG. 1. Process 200 begins with a test at step 205 to determine whether there is an upcoming fast-charge event. The determination may be based upon deduction/induction from operator actions and itinerary/schedule, past history of fast-charging events and locations stored and accessed from a memory in coordination with current location/destination, analysis of an SOC of ESS 105 in conjunction with navigation data providing fast-charging station locations in relation to current vehicle location, and the like. Process 200 loops back to step 205 when the test at step 205 is negative. When the test at step 205 is affirmative, process 200 advances to step 210 to establish parameters for the upcoming fast-charge event. Management system 120 may, when determining the upcoming fast-charge event consider how imminent/urgent the event and other parameters that may be used in setting/implementing the pre-fast-charge profile.

After step 210, process 200 performs step 215 to switch operational modes of the EV. Process 200 at step 215 causes the EV to begin operating in anticipation of the upcoming fast-charge event by using the pre-fast-charge profile instead of the operational profile. Of course the pre-fast-charge profile may be integrated into the operational profile to include the special operational steps described herein. These embodiments distinguish between an operational mode and the pre-fast-charge mode in that the pre-fast-charge mode causes the EV to operate in a mode other than that designed for standard driving conditions. In this example, a predominate distinction is modification to environmental control 135 to raise a temperature of the battery cells of ESS 105 to be above standard operating temperature, and more specifically to have the battery cells reach an ideal fast-charging temperature. The ideal fast-charging temperature is dependent upon many factors including SOC of battery cells of ESS 105, cumulative energy throughput of battery cells of ESS 105, direct current resistance of battery cells of ESS 105, power and incurrent available from the external power source, ambient temperature at the external power source, and desired fast-charge time, among others. A typical fast-charge optimal temperature from this example is 45+/−10° C.

Step 215 performs the switch to the pre-fast-charging profile at the appropriate time, the appropriate time based upon the time required to implement the parameters of the pre-fast-charging profile the level of aggressiveness in the implementation, and when the fast-charging event occurs or is scheduled to occur.

Process 200 tests at step 220 following step 215 whether the fast-charge event has been initiated/cancelled. Management system 120 is able to automatically detect when the fast-charge event begins or is canceled. When the test at step 220 is negative, process 200 performs step 225 and continues to operate the EV using the pre-fast charge profile. Some implementations of management system 120 operate in real-time or near-real time and adapt the pre-fast-charge profile to current information on temperature, SOC, range/time to initiation of the fast-charge event, and the like. After step 225, process 200 returns to step 220 to test whether the fast-charge event has been initiated/canceled. Some implementations may not provide a polling test but could be implemented as an interrupt-based upon the initiation/cancelation of the fast-charge event.

When the fast-charge event is initiated or canceled, the test at step 220 is affirmative and process 200 then performs step 230. Step 230 switches operation of the EV from the pre-fast-charge profile, such as, for example, to the operational profile. After step 230, process 200 returns to step 205 to monitor for another upcoming fast-charge event.

The following examples scenarios include representative determinations and pre-fast-charge profiles.

Example 1

At any point during operation, a user of the EV indicates a plan to perform a fast charge soon after completion of the current drive session. At this point, management system 120 implements the pre-fast-charge profile and causes the EV to enter a mode in which a goal of environmental control 135 is to maintain cell temperature as close to the ideal fast charge temperature as possible. This goal may be achieved in a number of ways, including: delaying HVAC events, reducing coolant flow rate in ESS 105, insulating ESS 105 with some mechanical apparatus, using some energy to warm ESS 105 during drive, and the like.

It would also be beneficial for management system 120 to include in its processing information relating to approximately how many miles away the fast charge location is (or other parameter that could be used to determine how long until the fast-charge event may occur). In this manner, a more aggressive method can be taken to prepare the battery as it approaches the fast charge station. Management system 120 can also take into account how much vehicle range is remaining in relation to the fast charge location. Management system 120 is able to use this information to set parameters of the pre-fast-charge profile such as how much energy from ESS 105 will be used and how aggressively ESS 105 can be warmed. (For example, if EV has a significant quantity of range left and is within a predetermined distance from/time to the fast charger, the pre-fast-charge profile may cause the EV to use additional energy to solely heat ESS 105 before arrival at the fast-charge location).

Example 2

Before a drive starts, the driver indicates that the drive will be a long/extended range drive. Fast charge locations are mapped out (manually or automatically) on the navigation system using GPS and other geolocation services. In this way, management system 120 is able to determine when to switch profiles as the EV approaches the identified locations.

In some situations, fast charging may not be available when charging is required. In such situations, e.g., at a hotel, motel, or other overnight charging location that does not support fast-charging, the charging locations are identified as "normal" charge locations. Management system 120 does not switch profiles for non-fast-charging locations.

Example 3

After a drive and once connected to a charger, management system 120 selects a correct charging temperature based on communication with the charging system (e.g., charge rate available, projected charge time, and the like) Management system 120 may predict as well what the most likely charge station will be once the SOC falls to a certain level and prepare accordingly for fast charge or standard charge (for instance while driving 200 miles away from home management system 120 predicts use of a fast charge when a fast charger is known to be within X number of miles when the SOC is getting low, or expect standard charging when SOC is low and the vehicle is near its usual charging port that is a standard charger.)

Example 4

Profile switching by management system 120 is not limited to changes initiated during drive, but is available during other standard operation to address time management of a given fast charge session. Upon initiation of a fast-charge event, the driver selects the range requested (SOC) and the time needed to achieve this SOC. Of course many of the times, this will be as much range as fast as possible. Other times when there is flexibility allows for several "medium rate" charge sessions that could be requested. In such cases, management system 120 can be smarter about how to use the time to prepare ESS 105. For example, when the driver requests 80% SOC in 2 hours, then management system 120 is able to determine the optimal combination of pre-heating ESS 105 and using a lower rate charge to meet the deadline. Similarly the driver may identify this need in terms of range by a certain time (for example, 80 miles range by 3 pm). The driver identification may be performed directly my using a user interface of management system 120 or management system 120 may deduce this information from an itinerary or calendar stored in, or accessible by, management system 120.

Example 5

Charging at a high enough rate naturally heats ESS 105 due to joule heating. Some pre-fast-charging profile accounts for the ambient and standard operating temperatures and slowly ramps up the fast-charging current, taking advantage of joule heating to minimize additional heating. Management system 120 may provide for use of short pulses to be used to heat up the battery at the start of a fast charge.

Management system 120 in a preferred embodiment includes a computer system with a processor and memory storing computer-program instructions implementing one or more of the processes and features described herein. In some embodiments, management system 120 includes a user interface.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A fast-charging system for a rechargeable energy storage system, comprising:
    a fast-charge prediction system identifying an upcoming fast-charge event for the rechargeable energy storage system;
    an environment control system coupled to the energy storage system controlling a temperature environment of the energy storage system responsive to a first operational profile using said temperature environment to adjust a temperature of the energy storage system to a first temperature target of a standard operating temperature; and
    a manager setting a second operational profile for said environment control system responsive to said upcoming fast-charge event, said second operation profile using said temperature environment to adjust said temperature of the energy storage system to a second temperature above said standard operating temperature.

2. The fast-charging system of claim 1 wherein said second temperature is in a range of 35° C. to 55° C.

3. The fast-charging system of claim 1 wherein said first temperature is less than 40° C. and wherein said second temperature is in a range of a lower fast-charger temperature to 55° C., wherein said lower fast-charger temperature is the greater of 35° C. and said first temperature.

4. The fast-charging system of claim 1 wherein said temperature environment includes a HVAC having a temperature lowering characteristic for the energy storage system after an activation by said environment control system and wherein said second operational profile delays said activation when adjusting said temperature of said energy storage system.

5. The fast-charging system of claim 1 wherein said temperature environment includes a heat exchanger with a coolant having a temperature lowering characteristic for the energy storage system responsive to a coolant flow rate set by said environment control system and wherein said second operational profile reduces said coolant flow rate to adjust said temperature of said energy storage system.

6. The fast-charging system of claim 1 wherein said temperature environment includes a variable insulating barrier having a temperature raising characteristic for the energy storage system after an activation by said environment control system and wherein said second operational profile actuates said activation to adjust said temperature of the energy storage system.

7. The fast-charging system of claim 1 wherein said fast-charge prediction system includes a user interface receiving a user input, said fast-charge prediction system identifies said upcoming fast-charge event responsive to said user input.

8. The fast-charging system of claim 1 wherein the energy storage system is disposed in an electric vehicle having an electric propulsion motor further comprising a navigation system geolocating a position of a fast-charge station along a drive route of said electric vehicle within a current drive range while said temperature environment operates with said first operational profile.

9. The fast-charging system of claim 8 wherein said fast-charge prediction system identifies said fast-charge event when said electric vehicle approaches said position within a predetermined distance and a maximum drive range of said electric vehicle is less than a predetermined range.

10. A fast-charging method for an energy storage system, comprising:
    a) identifying an upcoming fast-charge event for the rechargeable energy storage system;
    b) controlling a temperature environment for the energy storage system responsive to a first operational profile using said temperature environment to adjust a temperature of the energy storage system to a first temperature target for a standard operating temperature; and
    c) setting a second operational profile for said environment control system responsive to said upcoming fast-charge event, said second operation profile using said temperature environment to adjust said temperature to a second temperature above said standard operating temperature.

11. The fast-charging method of claim 10 wherein said identifying step a) includes responding to a user input manually indicating said upcoming fast-charge event.

12. The fast-charging method of claim 10 wherein said identifying step a) includes responding automatically using a computer system when said electric vehicle approaches a position of a fast-charging station within a predetermined distance and a maximum drive range of said electric vehicle is less than a predetermined range.

13. A charging system for a rechargeable energy storage system of an electric vehicle having an electric propulsion motor, comprising:
    a charge prediction system identifying an upcoming charge event for the rechargeable energy storage system, said charge prediction system predicting one of a fast-charge event and a non-fast-charge event for said upcoming charge event;
    an environment control system coupled to the energy storage system controlling a temperature environment of the energy storage system responsive to a first operational profile using said temperature environment to adjust a temperature of the energy storage system to a first temperature target of a standard operating temperature; and
    a manager setting a second operational profile for said environment control system responsive to said upcoming fast-charge event, said second operation profile using said temperature environment to adjust said temperature of the energy storage system to a second temperature above said standard operating temperature when said upcoming charge event includes said fast charge event, otherwise said manager maintaining said first operational profile for said environment control system when said upcoming charge event includes said non-fast-charge event.

14. The charging system of claim 13 wherein said second temperature is in a range of 35° C. to 55° C.

15. The charging system of claim 13 wherein said first temperature is less than 40° C. and wherein said second temperature is in a range of a lower fast-charger temperature to 55° C., wherein said lower fast-charger temperature is the greater of 35° C. and said first temperature.

16. The charging system of claim 13 wherein said temperature environment includes a HVAC having a temperature lowering characteristic for the energy storage system after an activation by said environment control system and wherein said second operational profile delays said activation when adjusting said temperature of said energy storage system.

17. The charging system of claim 13 wherein said temperature environment includes a heat exchanger with a coolant having a temperature lowering characteristic for the energy storage system responsive to a coolant flow rate set by said environment control system and wherein said second operational profile reduces said coolant flow rate to adjust said temperature of said energy storage system.

18. The charging system of claim 13 wherein said temperature environment includes a variable insulating barrier having a temperature raising characteristic for the energy storage system after an activation by said environment control system and wherein said second operational profile actuates said activation to adjust said temperature of the energy storage system.

19. The charging system of claim 13 wherein said fast-charge prediction system includes a user interface receiving a user input, said fast-charge prediction system identifies said upcoming fast-charge event responsive to said user input.

* * * * *